Patented July 14, 1931

1,814,853

UNITED STATES PATENT OFFICE

MARK E. PUTNAM, OF MIDLAND, MICHIGAN, ASSIGNOR TO THE DOW CHEMICAL COMPANY, OF MIDLAND, MICHIGAN, A CORPORATION OF MICHIGAN

METHOD OF PURIFYING METHYL SALICYLATE

No Drawing.   Application filed January 13, 1930.   Serial No. 420,640.

The present invention relates to a method of purifying crude methyl salicylate by means of which last traces of such impurities as phenol may be readily eliminated and a product obtained, the purity of which is extremely high.

Synthetic methyl salicylate prepared by the esterification of salicylic acid contains impurities which are difficult of removal by processes heretofore proposed, such as distillation, and a method of removing such impurities to obtain thereby highly purified methyl salicylate is greatly to be desired.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of various ways in which the principle of the invention may be used.

The melting point of methyl salicylate is given in the current handbook as −8.3° C. Since it is known that in many cases purification may be obtained by crystallization whereby a pure crystal is formed in an impure mother liquor and may be separated therefrom, I have attempted to purify methyl salicylate by crystallizing out the pure product in that manner, but have found that such crystals, having a melting point in the neighborhood of −8.3° C., are soft and form with the mother liquor a mush not adapted to the ready separation of the solid from the liquid fractions and that purification by such method is not practicable. It has been observed, however, recently that a different type of crystal may be formed having a melting point approximately −1.0° C., which crystal is hard, forms a granular mush which may be stirred, if desired, without material change in the characteristics of the mush, drains readily and may be effectively separated from the mother liquor by draining or by centrifuging, or other commonly practiced procedures.

In order to utilize this type of crystal, I cool the impure methyl salicylate to a temperature sufficiently below the melting point, −1.0° C., of the crystals, say to −10° C., and seed with such crystals whereupon the temperature rises with the formation of a batch of crystals of the seed type. Cooling may be continued to increase the quantity of crystals formed. Stirring may be practiced to form a granular mush or the crystallization may be carried out in a vessel without stirring, permitting the formation upon the walls thereof of a solid mass, with the mother liquor occupying the interior portion. When a sufficient crop of the crystals has been formed, they may be separated from the mother liquor, in the first instance by draining or centrifuging, and may then be washed with methyl alcohol or with previously purified methyl salicylate; or, if the crystals have been formed in the solid mass, the mother liquor may be decanted and washing practiced in situ by rinsing out with methyl alcohol, or with previously purified methyl salicylate, after which the mass of crystals may be broken up and further washed, if desired, drained and allowed to melt, or the solid mass of crystals may be melted in situ.

I find further that a more nearly perfect purification may be attained by adding a suitable diluent, for which use methyl alcohol is obviously indicated. By the addition of a diluent, a crop of very pure crystals may be formed and the diluent facilities the free draining of the mother liquor which will contain the bulk of the impurities. The alcohol concentrates in the mother liquor and may be recovered therefrom by distillation or it may be converted to methyl salicylate in the process.

Inasmuch as, up to this time, the formation of the hard, granular type of crystal has been accidental, I find it advantageous to maintain a supply thereof in a suitably cooled storage space and to use some of the so preserved crystals for the purpose of seeding to insure that the hard, granular type of crystal shall be formed rather than the soft type.

Without the use of a diluent, I have separated as high as 85 per cent of the purified methyl salicylate in one cooling operation by my method. Using 10 per cent methyl alcohol as diluent, I have separated some 80 per cent of the salicylate, but in a state of more nearly perfect purity.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of purifying crude methyl salicylate, the steps which consist in crystallizing a portion thereof in the form of relatively pure methyl salicylate having a hard crystal structure and characterized further by having a melting point in the neighborhood of $-1.0°$ C., and separating such crystals from the remaining mother liquor.

2. In a method of purifying crude methyl salicylate, the steps which consist in cooling the impure salicylate to a temperature below $-1.0°$ C. short of that whereat spontaneous crystallization occurs, seeding the so cooled salicylate with methyl salicylate crystals characterized by having a melting point of approximating $-1.0°$ C., to initiate formation of more such crystals, and separating such crystals from the mother liquor.

3. In a method of purifying crude methyl salicylate, the steps which consist in cooling the impure salicylate to a temperature at least as low as $-1.0°$ C., thereupon introducing crystalline methyl salicylate characterized by having a melting point approximating $-1.0°$ C. to initiate the further formation of such crystals, continuing the cooling to increase the further production of such crystals and separating the so formed crystals from the mother liquor.

4. In a method of purifying crude methyl salicylate, the steps which consist in adding thereto a diluent, cooling the mixture, adding methyl salicylate crystals characterized by having a melting point approximating $-1.0°$ C. to initiate the further formation of such crystals and separating the so formed crystals from the mother liquor.

5. In a method of purifying crude methyl salicylate, the steps which consist in adding methyl alcohol to the impure salicylate, cooling the so diluted salicylate, adding to the so cooled mixture methyl salicylate crystals characterized by having a melting point approximating $-1.0°$ C. to initiate the production therein of further crystals of that type and separating the crystals so formed from the mother liquor.

Signed by me, this 10th day of January, 1930.

MARK E. PUTNAM.